US012577740B2

(12) United States Patent
    Richards

(10) Patent No.: US 12,577,740 B2
(45) Date of Patent: Mar. 17, 2026

(54) PLATE COMPACTOR

(71) Applicant: MILWAUKEE ELECTRIC TOOL CORPORATION, Brookfield, WI (US)

(72) Inventor: Ian C. Richards, Shorewood, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 882 days.

(21) Appl. No.: 17/877,144

(22) Filed: Jul. 29, 2022

(65) Prior Publication Data

US 2023/0034090 A1     Feb. 2, 2023

Related U.S. Application Data

(60) Provisional application No. 63/227,384, filed on Jul. 30, 2021.

(51) Int. Cl.
    *E01C 19/40*     (2006.01)
    *E02D 3/046*     (2006.01)
    *F16F 15/08*     (2006.01)

(52) U.S. Cl.
    CPC ............ *E01C 19/402* (2013.01); *E02D 3/046* (2013.01); *F16F 15/08* (2013.01)

(58) Field of Classification Search
    CPC ......... E01C 19/402; E02D 3/046; F16F 15/08
    USPC .................................. 14/133.05, 133.1–133.2
    See application file for complete search history.

(56) References Cited

U.S. PATENT DOCUMENTS

| | | | | |
|---|---|---|---|---|
| 3,728,793 | A | * | 4/1973 | Makinson ................ B27B 17/02 |
| | | | | 173/162.1 |
| 3,782,845 | A | | 1/1974 | Briggs et al. |

| | | | | |
|---|---|---|---|---|
| 6,543,741 | B1 | * | 4/2003 | Li ............................ F16F 15/08 |
| | | | | 248/638 |
| 6,551,022 | B1 | | 4/2003 | Stayner |
| 6,582,155 | B1 | | 6/2003 | Bromberger et al. |
| 6,588,977 | B1 | | 7/2003 | Stayner |
| 8,708,599 | B2 | | 4/2014 | Steffen |
| 9,284,697 | B2 | | 3/2016 | Steffen |
| 10,344,439 | B2 | | 7/2019 | Steffen et al. |
| 10,363,614 | B2 | * | 7/2019 | O'Sullivan ......... H01M 50/247 |
| 10,661,426 | B2 | * | 5/2020 | Aoki ...................... B25F 5/006 |

(Continued)

FOREIGN PATENT DOCUMENTS

| | | |
|---|---|---|
| CN | 102561159 A | 7/2012 |
| CN | 206680987 U | 11/2017 |

(Continued)

OTHER PUBLICATIONS

International Search Report and Written Opinion for Application No. PCT/US2022/038840 dated Nov. 25, 2022 (12 pages).

*Primary Examiner* — Raymond W Addie

(74) *Attorney, Agent, or Firm* — Michael Best & Friedrich LLP

(57) ABSTRACT

A compactor includes a plate, a vibration mechanism configured to impart a vibrating motion on the plate, and a housing configured to support control electronics therein and defining a battery receptacle upon which a battery pack is connectable. The control electronics are configured to selectively activate the vibration mechanism using electrical current from the battery pack. A frame extends between the plate and the housing, and a vibration isolator is disposed between the housing and the frame and configured to vibrationally isolate the housing from the frame.

19 Claims, 7 Drawing Sheets

(56)     References Cited

U.S. PATENT DOCUMENTS

| | | | | |
|---|---|---|---|---|
| 2002/0096341 A1* | 7/2002 | Hagan | ..................... | B25B 23/14 |
| | | | | 173/217 |
| 2009/0078847 A1* | 3/2009 | McMickell | ............ | F16F 15/02 |
| | | | | 248/550 |
| 2013/0004237 A1 | 1/2013 | Krings et al. | | |
| 2013/0251452 A1* | 9/2013 | Steffen | ................... | E02D 3/074 |
| | | | | 404/133.05 |
| 2013/0330576 A1* | 12/2013 | Kolden | ................ | H01M 10/05 |
| | | | | 429/7 |
| 2020/0076337 A1* | 3/2020 | Abbott | ...................... | H02P 6/34 |
| 2021/0143710 A1 | 5/2021 | Sprague et al. | | |
| 2021/0184535 A1* | 6/2021 | Mizuguchi | .............. | H02K 5/04 |

FOREIGN PATENT DOCUMENTS

| | | | | | |
|---|---|---|---|---|---|
| CN | 209114458 U | * | 7/2019 | ............ | E02D 3/046 |
| CN | 110552341 A | | 12/2019 | | |
| CN | 111705598 A | | 9/2020 | | |
| DE | 102018128610 A1 | | 5/2020 | | |
| EP | 1267001 B1 | | 9/2009 | | |
| EP | 3085832 B1 | | 6/2019 | | |
| JP | 2006161508 A | | 6/2006 | | |
| JP | 2013181324 A | | 9/2013 | | |
| WO | 2013107613 A1 | | 7/2013 | | |
| WO | WO-2020049617 A1 | * | 3/2020 | .............. | H02K 5/24 |
| WO | 2020194727 A1 | | 10/2020 | | |
| WO | 2020202585 A1 | | 10/2020 | | |
| WO | 2021131007 A1 | | 7/2021 | | |

* cited by examiner

PLATE COMPACTOR

CROSS-REFERENCE TO RELATED APPLICATIONS

This application claims priority to U.S. Provisional Patent Application No. 63/227,384, filed on Jul. 30, 2021, the entire content of which is incorporated herein by reference.

FIELD OF THE INVENTION

The present invention relates to walk-behind construction equipment, and more particularly to vibratory construction equipment.

BACKGROUND OF THE INVENTION

Many types of construction equipment, such as plate compactors and rammers, generate vibrations while imparting a force on a work surface. These vibrations can cause damage to components of the construction equipment (e.g., electronics).

SUMMARY OF THE INVENTION

The present invention provides, in one aspect, a compactor including a plate, a vibration mechanism configured to impart a vibrating motion on the plate, and a housing configured to support control electronics therein and defining a battery receptacle upon which a battery pack is connectable. The control electronics are configured to selectively activate the vibration mechanism using electrical current from the battery pack. A frame extends between the plate and the housing, and a vibration isolator is disposed between the housing and the frame and configured to vibrationally isolate the housing from the frame.

The present invention provides, in another aspect, a compactor including a plate, a vibration mechanism configured to impart a vibrating motion on the plate, and a housing configured to support control electronics therein and defining a battery receptacle upon which a battery pack is connectable. The control electronics are configured to selectively activate the vibration mechanism using electrical current from the battery pack. A frame extends between the plate and the housing. A plurality of rigid tie rods are fixed to the frame and extend through the housing, and a plurality of vibration isolators are configured to vibrationally isolate the housing from the frame.

The present invention provides, in yet another aspect, a compactor including a plate, a vibration mechanism configured to impart a vibrating motion on the plate, and a housing configured to support control electronics therein and defining a battery receptacle upon which a battery pack is connectable. The control electronics are configured to selectively activate the vibration mechanism using electrical current from the battery pack. A frame extends between the plate and the housing. A plurality of rigid tie rods extend through the housing, and a plurality of vibration isolators are disposed between the tie rods and the frame. The vibration isolators are configured to vibrationally isolate the housing from the frame.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
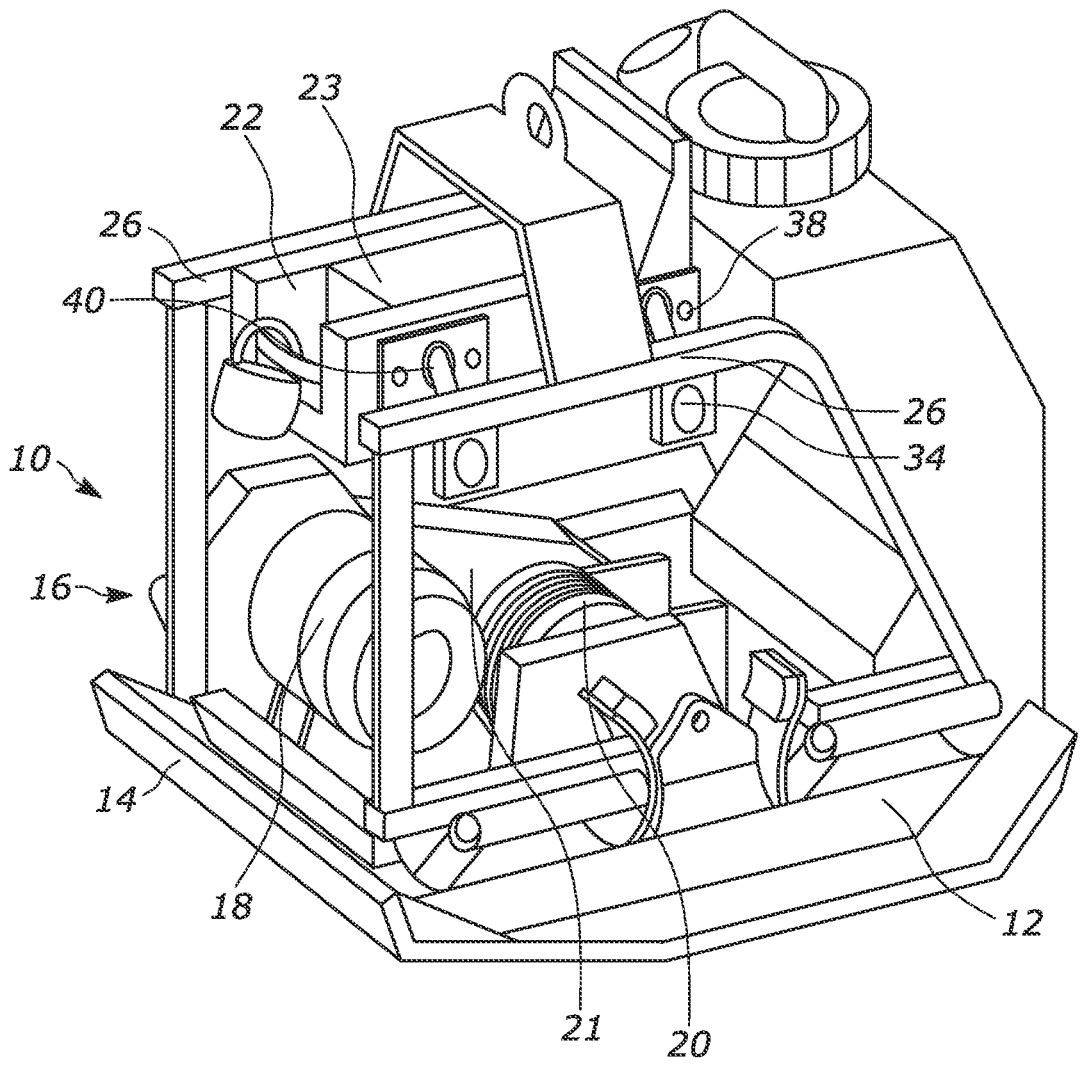
FIG. 1 is perspective view of a plate compactor in accordance with an embodiment of the present disclosure.

With reference to FIG. 1 of the drawings, a type of construction equipment, illustrated as a plate compactor 10, imparts vibration on a plate 14, which in turn impacts a work surface (e.g., the ground) to compact the work surface. The plate compactor 10 includes a base 12, a vibration mechanism 16 mounted upon the base 12, and a frame 26 coupled to the base 12. In the illustrated embodiment, the vibration mechanism 16 includes an electric motor 18 (e.g., a brushless DC electric motor) and an unbalanced weight assembly 20 (e.g., an eccentric shaft) via a belt or chain drive 21. Alternatively, the motor 18 may directly drive the unbalanced weight assembly 20 without an intervening belt or chain drive. Rotation of the unbalanced weight assembly 20 induces a vertical vibrating motion on the plate 14, causing the plate 14 to impact the work surface. A battery pack 23 is supported on the compactor 10 and is a power source for the electric motor 18 (FIG. 1). Operation of the compactor 10 is governed by a set of control electronics 28. The plate compactor 10 includes a housing 22, which supports both the battery pack 23 and control electronics 28, and which is vibrationally isolated from the remainder of the plate compactor 10. More particularly, the housing 22 includes a battery receptacle 24 disposed on an upper surface of the housing 22 while the control electronics 28 are supported within the housing 22.

Figure 2:
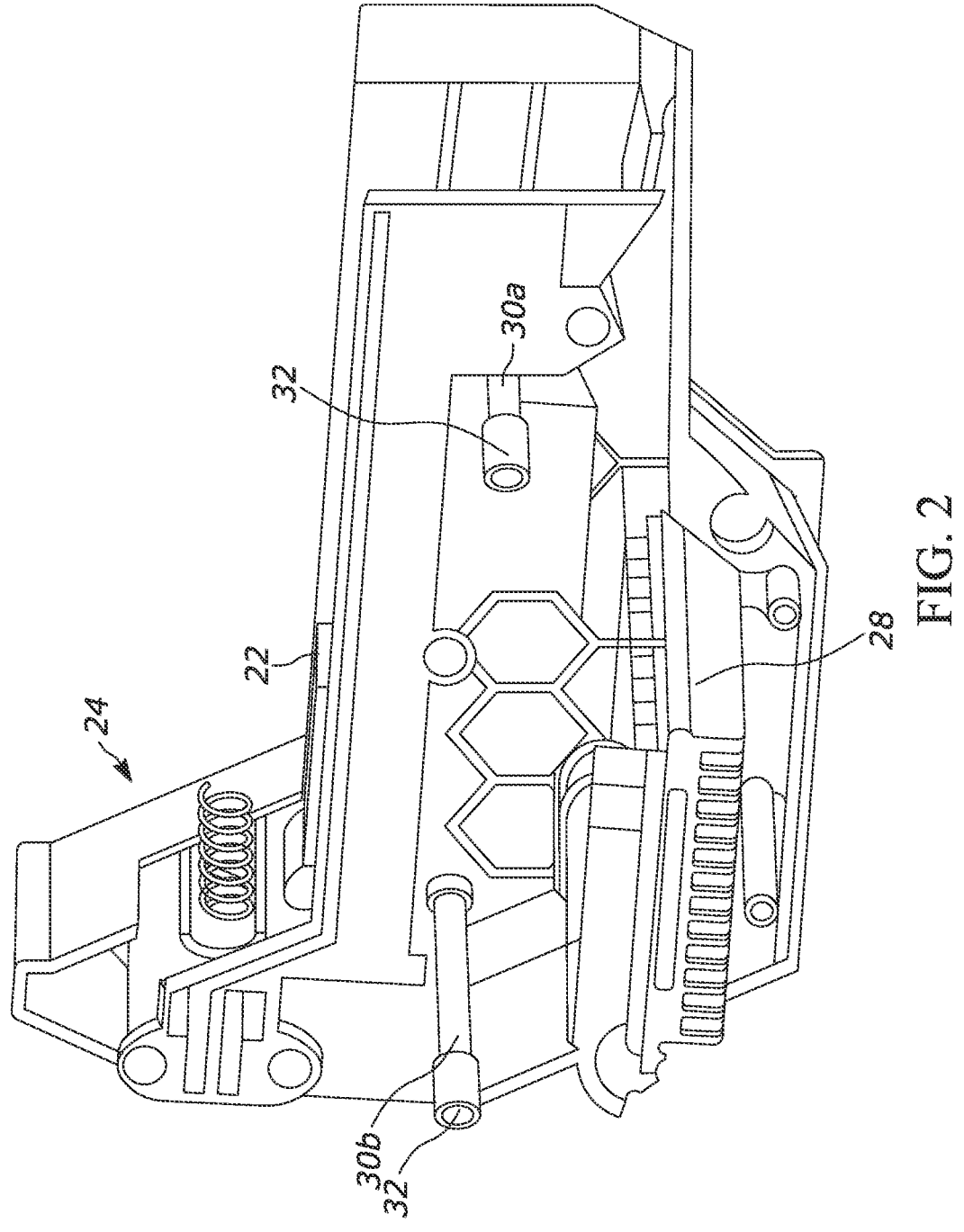
FIG. 2 is a perspective view of a portion of a battery and electronics housing of the plate compactor of FIG. 1.

The housing 22 is coupled to the frame 26 of the plate compactor 10 via a plurality of rigid tie rods 30 (FIG. 2), bolts 34, and vibration isolators 38. The illustrated embodiment includes a front tie rod 30a and a rear tie rod 30b. The tie rods 30 extend laterally between two parallel bars of the frame 26 (e.g., a left frame member and a right frame member) and through the housing 22. Each end of each of the tie rods 30 includes a threaded bore 32 to receive a bolt 34. The frame 26 includes bolt holes through which the bolts 34 extend to engage the tie rods 30. In other words, each bolt 34 extends though the frame 26 and is threadedly coupled to a tie rod 30 via the threaded bore 32. Therefore, each tie rod 30 is bolted to the frame 26 of the plate compactor 10 forming a rigid connection between the tie rods 30 and the frame 26.

As shown in FIG. 1, the vibration isolators 38 surround portions of the tie rods 30 and are disposed between the housing 22 and the tie rods 30. The vibration isolators 38 function to vibrationally isolate the housing 22 from the tie rods 30 and the frame 26. In some embodiments of the plate compactor 10, each of the vibration isolators 38 includes an outer mount 40 secured to the housing 22 (e.g., via fasteners, etc.) and an inner damping member (e.g., a rubber bushing; not shown) disposed between the outer mount 40 and the tie rod 30. In such an embodiment, the outer mounts 40 are rigidly connected to the housing 22 and the damping members isolate the housing 22 from the tie rods 30, which are rigidly connected to the frame 26. Therefore, as the frame 26 vibrates during operation of the plate compactor 10, the control electronics 28 that are disposed within the housing 22 and the battery pack 23 that is disposed on the housing 22 are vibrationally isolated and less likely to be damaged due to the vibration of the vibration mechanism 16.

Figure 3:
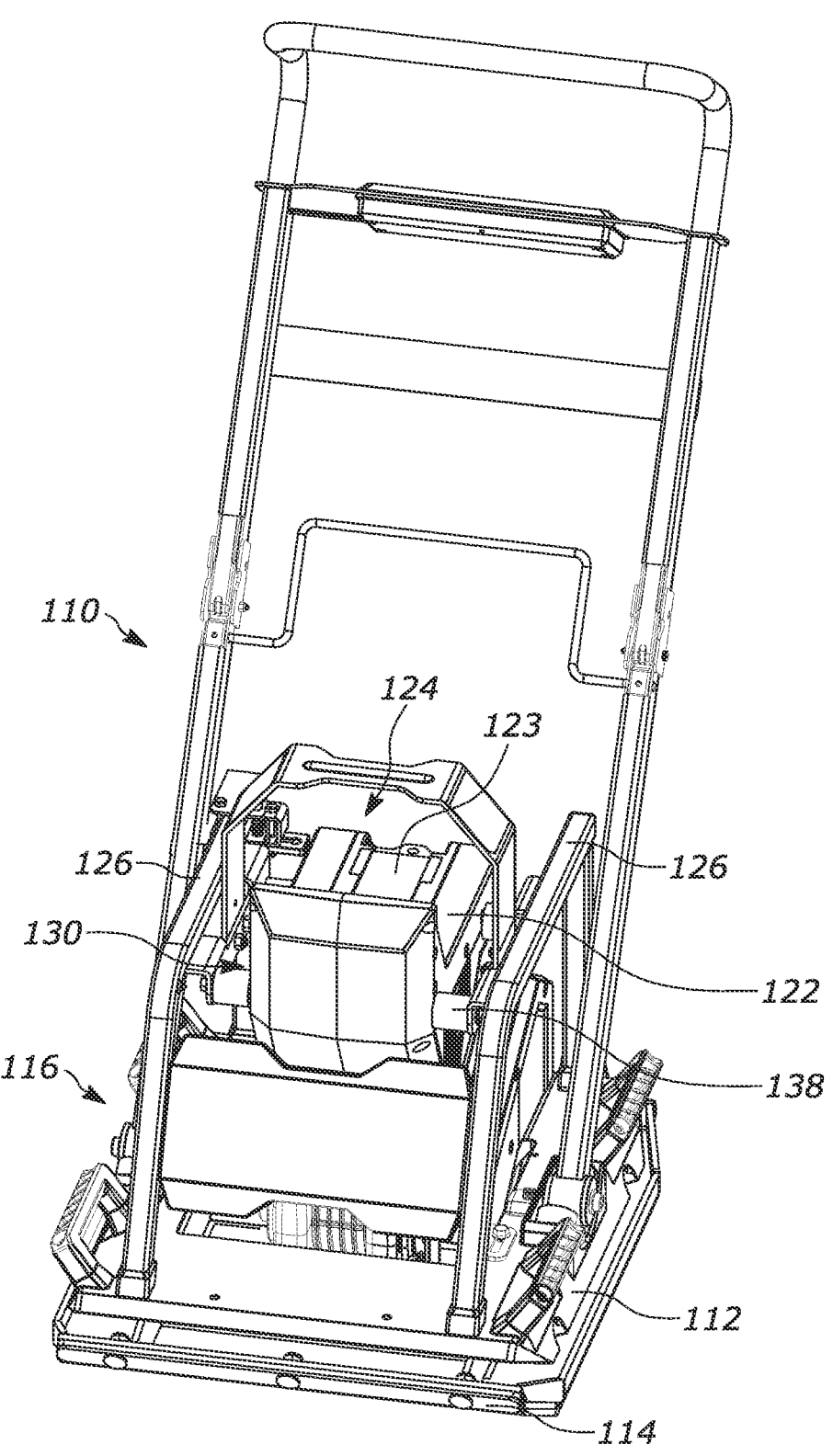
FIG. 3 is a perspective view of a plate compactor in accordance with another embodiment of the present disclosure.
Figure 4:
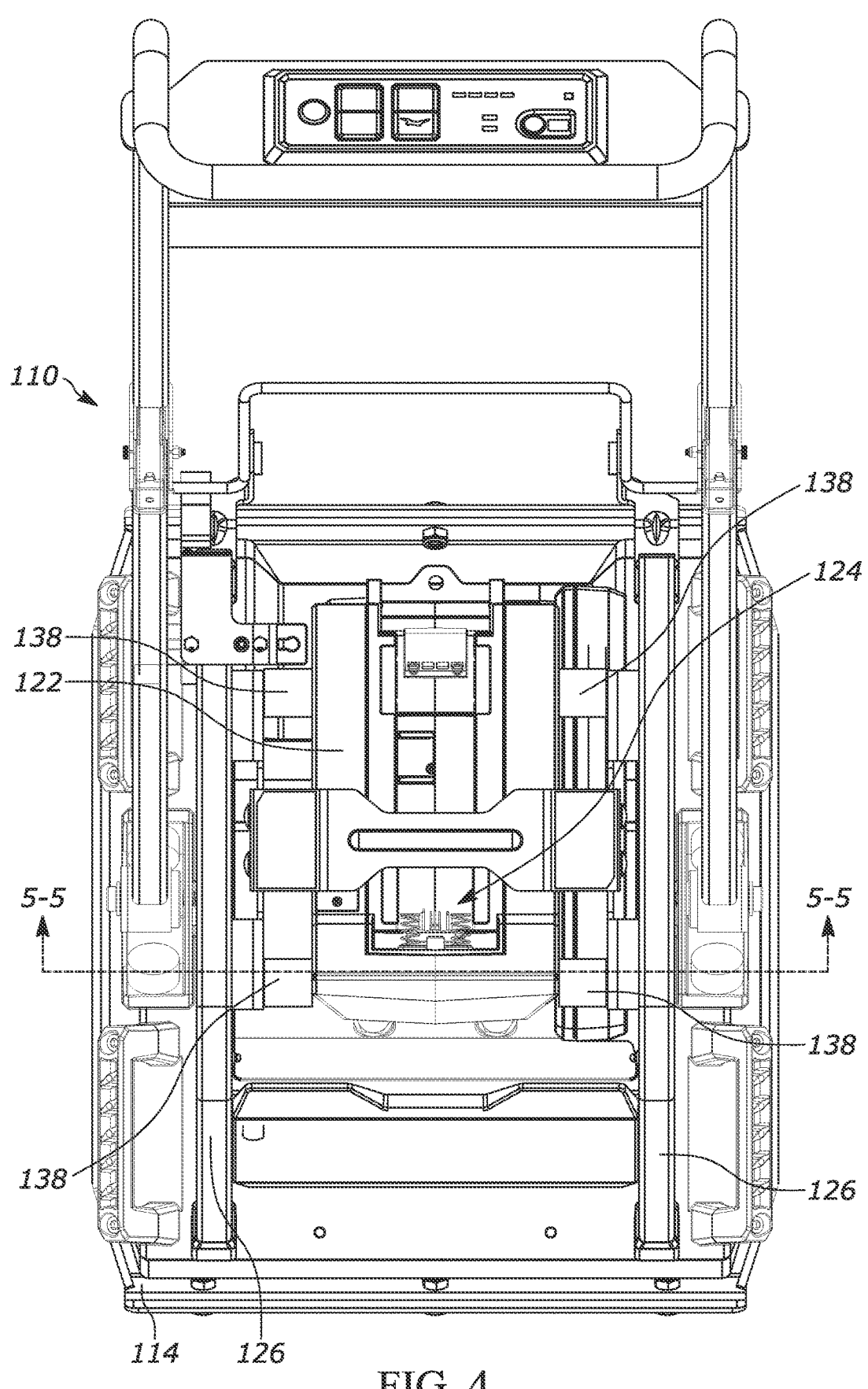
FIG. 4 is a top view of the plate compactor of FIG. 3.
Figure 5:
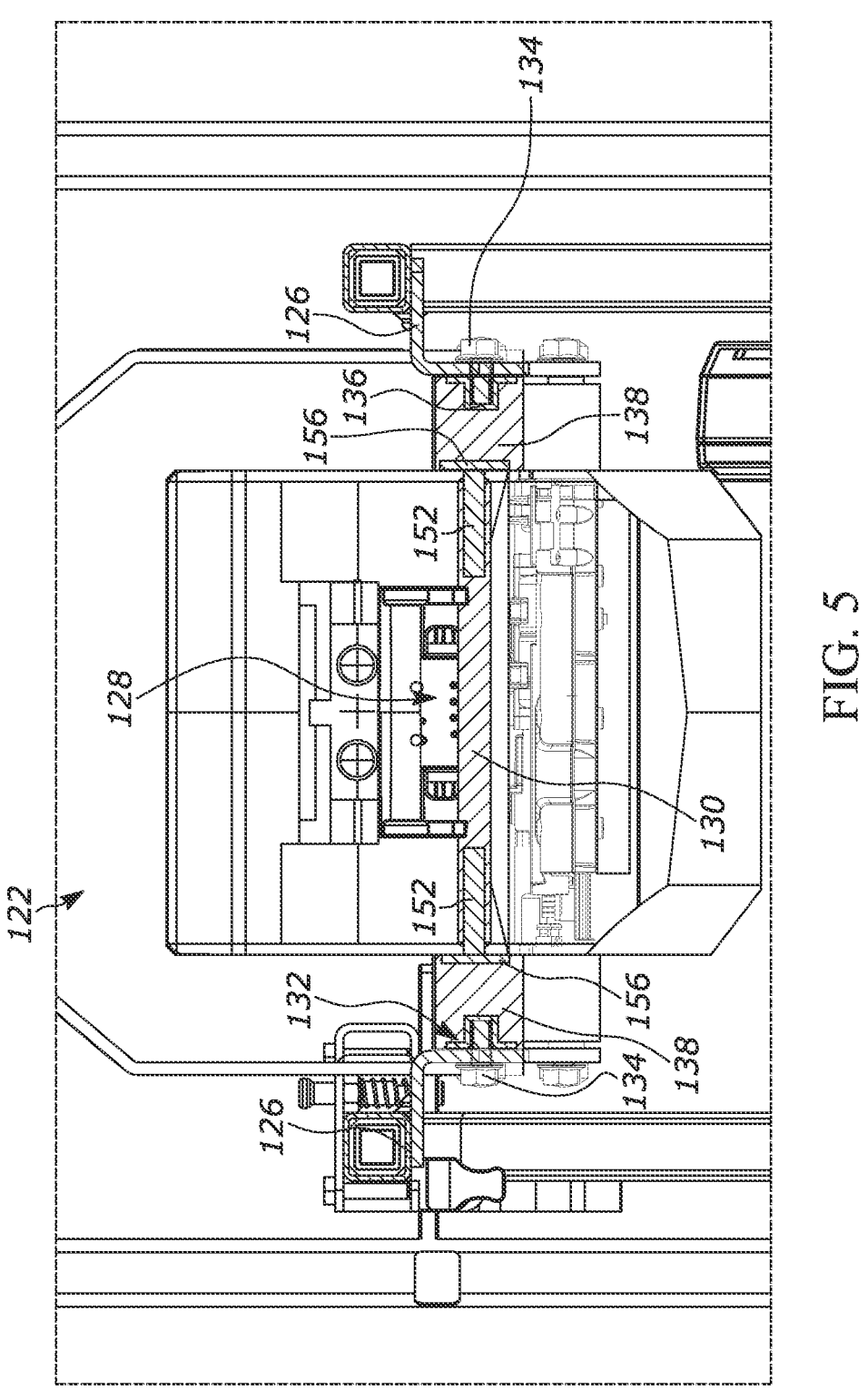
FIG. 5 is a detail cross-sectional view of the plate compactor of FIG. 3, taken along section line 5-5 in FIG. 4.

FIGS. 3-5 illustrate another embodiment of a plate compactor 110 according to the present disclosure, with like parts having like reference numerals plus the number "1" appended thereon and the following differences explained below. Unlike the tie rods 30 of the embodiment of FIG. 1, the tie rods 130 are not directly bolted to the frame 26. Rather, each end of the tie rod 130 is fixedly coupled to a vibration isolator 138. In the illustrated embodiment, the vibration isolators 138 are rubber bushings having a generally cylindrical outer profile, and each tie rod 130 is secured to an axial end face of a corresponding vibration isolator 138. More particularly, each vibration isolator 138 includes a threaded stud 152 coupled to a plate 156 and extending from the vibration isolator 138. The threaded stud 152 is configured to be threadedly coupled to the tie rod 130. The vibration isolator 138 may be over molded onto the plate 156 to secure the plate 156 and the stud 152 to the vibration isolator 138. An opposite axial end face of the vibration isolator 138 includes a threaded bore 132 for receiving the bolt 134. In the illustrated embodiment, the threaded bore 132 includes an insert 136 formed from a similar material as the tie rod 130 (e.g., a metal). In other words, the insert 136 is formed of a material more rigid than the vibration isolator 138. The vibration isolator 138 allows the tie rod 130, and thus the housing 122, to move relative to the frame 126, thereby preventing vibration generated during operation of the compactor 110 from affecting the control electronics 128 and battery pack 123 that are supported by the housing 122.

Figure 6:
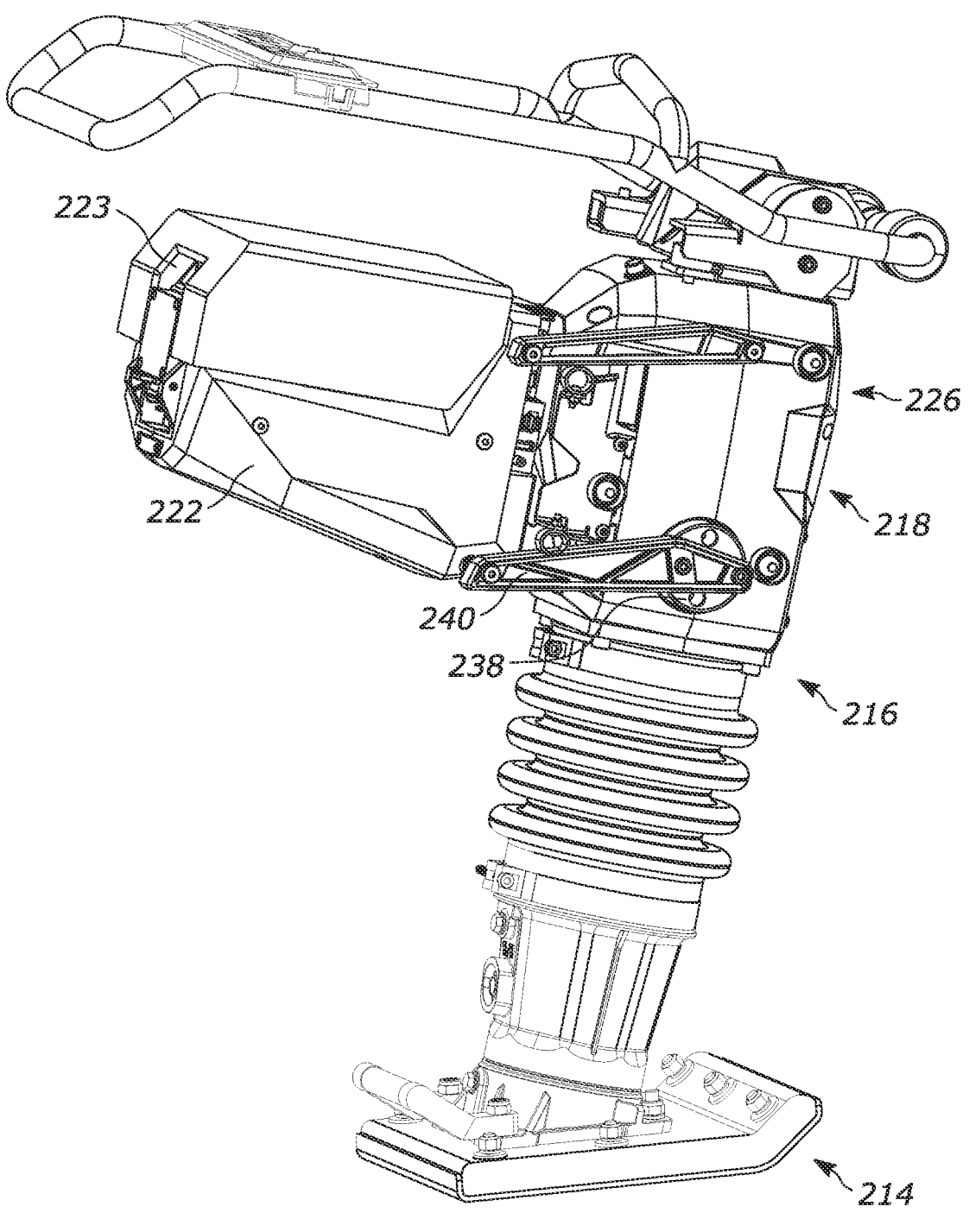
FIG. 6 is a perspective view of a vibratory rammer in accordance with yet another embodiment of the present disclosure.
Figure 7:
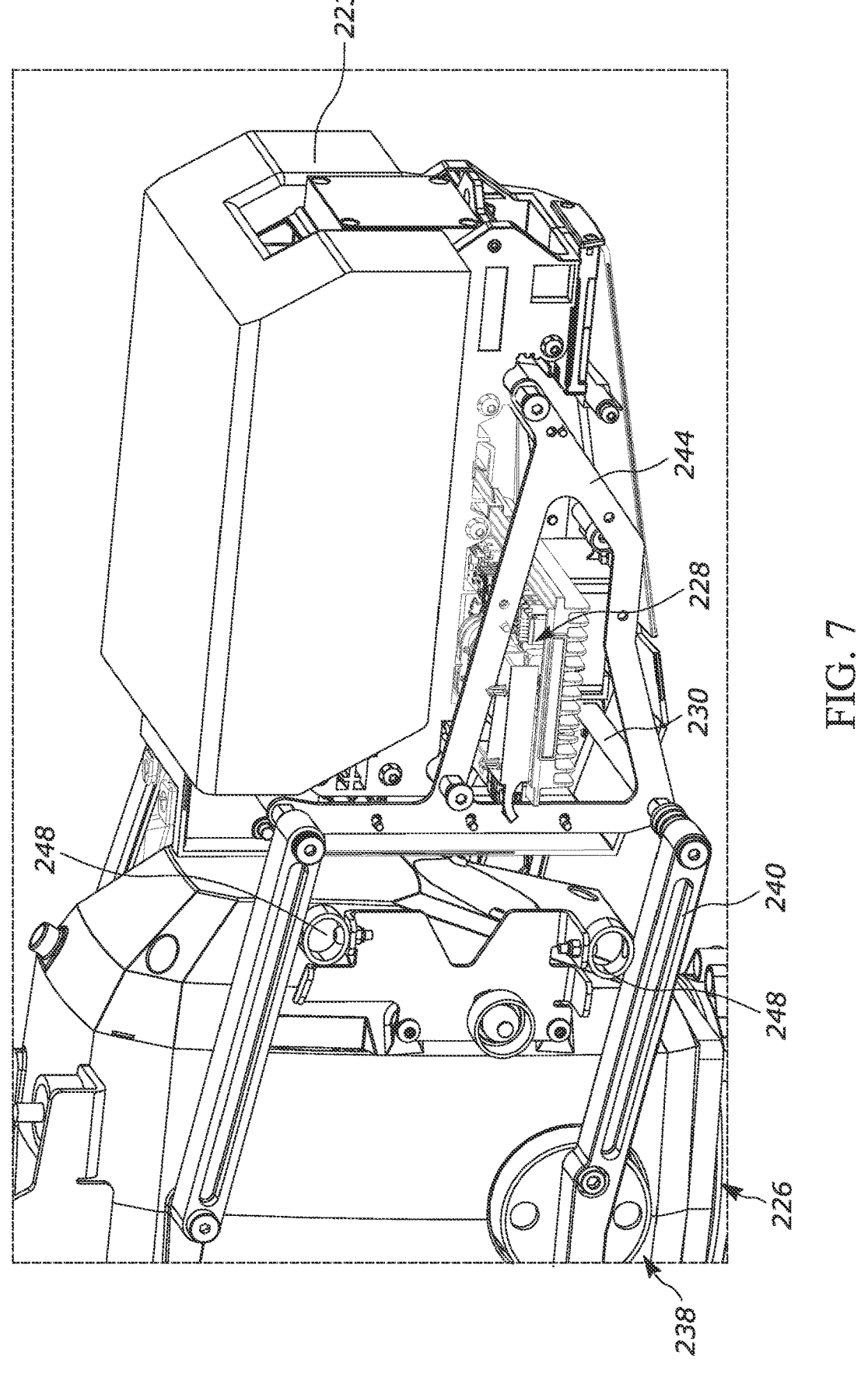
FIG. 7 is a partial perspective view of a vibratory rammer of FIG. 6.

FIGS. 6-7 illustrate yet another embodiment of a housing 222 that supports a battery pack 223 and control electronics 228 (FIG. 7) and is vibrationally isolated from a frame 226, with like parts having like reference numerals plus the number "2" appended thereon and the following differences explained below. Rather than being applied to a plate compactor, the housing 222 supports the battery pack 223 and control electronics 228 for another type of construction equipment, such as a vibratory rammer. An internal frame 244 is disposed within the housing 222 and supports the weight of the control electronics 228. Similar to the housing 222, the internal frame 244 is coupled to the tie rods 230. The housing 222 may be formed of plastic or a similar material, and the inclusion of an internal frame 244 coupled to the tie rods 230 prevents the load due to the weight of the control electronics 228 from being transmitted to the housing 222. In the illustrated embodiment, the vibratory rammer includes a linkage 240 disposed between the frame 226 and the tie rods 230. The linkage 240 allows for relative movement between the housing 222 and the frame 226, and upper and lower bumpers 248 are configured to limit the relative movement between the housing 222 and the frame 226. In the illustrated embodiment, the tie rods 230 are coupled to the linkage 240 without a vibration isolator therebetween, and the a vibration isolator 238 is disposed between the linkage 240 and the frame 226. However, in some embodiments, the tie rods 230 may be coupled to the linkage 240 with a vibration isolator therebetween.

The vibrationally isolated housing and tie rod arrangement has been described in relation to a plate compactor and a vibratory rammer. However, one of ordinary skill in the art will understand that the vibrationally isolated housing and tie rod arrangement described herein can alternatively be utilized with other vibratory or impact-generating construction equipment in which it is beneficial to isolate the control electronics and battery pack from vibration.

Although the invention has been described in detail with reference to certain preferred embodiments, variations and modifications exist within the scope and spirit of one or more independent aspects of the invention as described.

Various features and aspects of the present invention are set forth in the following claims.

What is claimed is:

1. A compactor comprising:
a plate;
a vibration mechanism configured to impart a vibrating motion on the plate;
a housing configured to support control electronics therein and defining a battery receptacle upon which a battery pack is connectable, the control electronics configured to selectively activate the vibration mechanism using electrical current from the battery pack;
a frame extending between the plate and the housing;
a vibration isolator disposed between the housing and the frame and configured to vibrationally isolate the housing from the frame; and
at least one tie rod coupled to the frame, wherein the housing is coupled to the frame via the at least one tie rod.

2. The compactor of claim 1, further comprising an internal frame disposed within the housing and configured to support the control electronics, wherein the internal frame is coupled to the vibration isolator such that the internal frame is vibrationally isolated from the frame.

3. The compactor of claim 1, wherein the vibration isolator is disposed between the housing and the tie rod.

4. The compactor of claim 1, wherein the vibration isolator includes a rubber bushing.

5. The compactor of claim 4, wherein the vibration isolator includes an outer mount configured to be coupled to the housing, and wherein the rubber bushing is disposed within the outer mount.

6. The compactor of claim 5, wherein the outer mount is rigidly coupled to the housing.

7. A compactor comprising:
a plate;
a vibration mechanism configured to impart a vibrating motion on the plate;
a housing configured to support control electronics therein and defining a battery receptacle upon which a battery pack is connectable, the control electronics configured to selectively activate the vibration mechanism using electrical current from the battery pack;
a frame extending between the plate and the housing;
a plurality of rigid tie rods fixed to the frame and extending through the housing; and

a plurality of vibration isolators disposed between the housing and the tie rods, wherein the vibration isolators are configured to vibrationally isolate the housing from the frame.

8. The compactor of claim 7, further comprising an internal frame disposed within the housing and configured to support the control electronics, wherein the internal frame is coupled to the vibration isolators such that the internal frame is vibrationally isolated from the frame.

9. The compactor of claim 7, further comprising a plurality of bolts extending through the frame and threaded to the tie rods, the bolts configured to rigidly affix the tie rods to the frame.

10. The compactor of claim 7, wherein the vibration isolators include rubber bushings.

11. The compactor of claim 10, wherein each of the vibration isolators includes an outer mount configured to be coupled to the housing, and wherein the rubber bushing is disposed within the outer mount.

12. The compactor of claim 11, wherein the outer mount is rigidly connected to the housing.

13. A compactor comprising:

a plate;

a vibration mechanism configured to impart a vibrating motion on the plate;

a housing configured to support control electronics therein and defining a battery receptacle upon which a battery pack is connectable, the control electronics configured to selectively activate the vibration mechanism using electrical current from the battery pack;

a frame extending between the plate and the housing;

a plurality of rigid tie rods extending through the housing; and a plurality of vibration isolators disposed between the tie rods and the frame, wherein the vibration isolators are configured to vibrationally isolate the housing from the frame.

14. The compactor of claim 13, wherein the vibration isolators are rubber bushings having a cylindrical outer profile.

15. The compactor of claim 14, wherein a first axial end face of each bushing is coupled to an end of a corresponding tie rod, and wherein a second, opposite, axial end face of each bushing is coupled to the frame.

16. The compactor of claim 15, further comprising a plurality of bolts extending through the frame and configured to be threadedly coupled to the second axial end face of each bushing.

17. The compactor of claim 16, wherein the second axial end face of each bushing includes a rigid insert, and wherein the rigid insert is threaded to receive the bolt.

18. The compactor of claim 13, further comprising an internal frame disposed within the housing and configured to support the control electronics.

19. The compactor of claim 18, wherein the internal frame is coupled to the tie rods and configured to be vibrationally isolated from the frame.

* * * * *